(12) United States Patent
Park

(10) Patent No.: US 11,745,735 B2
(45) Date of Patent: Sep. 5, 2023

(54) ADVANCED DRIVER ASSISTANCE SYSTEM, VEHICLE HAVING THE SAME, AND METHOD OF CONTROLLING VEHICLE

(71) Applicant: HL KLEMOVE CORP., Incheon (KR)

(72) Inventor: Jinhyeon Park, Osan-si (KR)

(73) Assignee: HL KLEMOVE CORP., Incheon (KR)

(*) Notice: Subject to any disclaimer, the term of this patent is extended or adjusted under 35 U.S.C. 154(b) by 244 days.

(21) Appl. No.: 17/133,961

(22) Filed: Dec. 24, 2020

(65) Prior Publication Data

US 2021/0197807 A1 Jul. 1, 2021

(30) Foreign Application Priority Data

Dec. 26, 2019 (KR) .................. 10-2019-0175541

(51) Int. Cl.
*B60W 30/095* (2012.01)
*B60W 30/09* (2012.01)
(Continued)

(52) U.S. Cl.
CPC ........... *B60W 30/095* (2013.01); *B60Q 1/343* (2013.01); *B60W 30/09* (2013.01); *B60W 40/105* (2013.01); *B60W 40/114* (2013.01); *B60W 2554/4041* (2020.02); *B60W 2554/4044* (2020.02)

(58) Field of Classification Search
CPC ....... B60Q 1/343; B60Q 9/008; B60W 30/09; B60W 40/105; B60W 40/114; B60W 60/00; B60W 2420/42; B60W 2510/0638; B60W 2510/18; B60W 2520/12; B60W 2554/4029; B60W 2554/4041; B60W 2554/4044; B60W 2554/80; B60W 2556/50; G06V 20/58

See application file for complete search history.

(56) References Cited

U.S. PATENT DOCUMENTS

2017/0113665 A1* 4/2017 Mudalige ............... G08G 1/166
2019/0018419 A1* 1/2019 Lee ....................... G05D 1/0214
(Continued)

FOREIGN PATENT DOCUMENTS

| JP | 2009-116539 A | 5/2009 |
| JP | 4946005 B2 | 6/2012 |
| JP | 6007739 B2 | 10/2016 |

*Primary Examiner* — Peter D Nolan
*Assistant Examiner* — Ce Li Li
(74) *Attorney, Agent, or Firm* — Hauptman Ham, LLP

(57) ABSTRACT

A method of controlling the vehicle includes determining whether a section to be driven is a turn section; in response to determining that the section to be driven is the turn section, generating a turn path; generating a first risk of collision region based on the generated turn path; predicting a position of an obstacle based on obstacle information detected by an obstacle detector and driving information detected by a driving information detector; generating a second risk of collision region based on the predicted position of the obstacle; based on image information obtained from an imager, determining whether the obstacle exists in the first and second risk of collision regions, respectively; adjusting a risk level based on the presence or absence of the obstacle in the first and second risk of collision regions; and performing a collision avoidance control corresponding to the adjusted risk level.

18 Claims, 9 Drawing Sheets

(51) Int. Cl.
 *B60W 40/105* (2012.01)
 *B60W 40/114* (2012.01)
 *B60Q 1/34* (2006.01)

(56) References Cited

U.S. PATENT DOCUMENTS

2020/0001879 A1\* 1/2020 Pietzsch ................ B60W 30/18
2021/0053561 A1\* 2/2021 Beller .................... G08G 1/166
2021/0055733 A1\* 2/2021 Beller ............... B60W 60/0017
2022/0234578 A1\* 7/2022 Das .................. B60W 30/0953

\* cited by examiner

ADVANCED DRIVER ASSISTANCE SYSTEM, VEHICLE HAVING THE SAME, AND METHOD OF CONTROLLING VEHICLE

CROSS-REFERENCE TO RELATED APPLICATION(S)

This application is based on and claims priority under 35 U.S.C. § 119 to Korean Patent Application No. 10-2019-0175541, filed on Dec. 26, 2019, the disclosure of which is incorporated herein by reference.

BACKGROUND

1. Field

The disclosure relates to an advanced driver assistance system for preventing collision with an obstacle, a vehicle having the same, and a method of controlling the vehicle.

2. Description of Related Art

In recent years, in order to prevent accidents caused by driver error, various advanced driver assistance systems (ADAS) have been developed that transmit driving information of a vehicle to a driver or perform autonomous driving for the driver's convenience.

As an example, there is a technology that detects obstacles around the vehicle by mounting a distance sensor on the vehicle and warns the driver.

As another example, a distance to another vehicle is obtained through an electromagnet mounted on a bumper of the vehicle, and if the obtained distance to another vehicle is within a certain distance, it is determined as a collision situation and power is supplied to the electromagnet to generate a magnetic force. There is a technology that allows the vehicle to automatically brake in the collision situation.

Although the ADAS for driver's safety and convenience is provided in the vehicle, points that drivers should be cautious when driving the vehicle must also change according to changes in surrounding conditions such as a width of a road, turn, traffic volume, and a number of cyclists or pedestrians. Points must also change. Accordingly, it is necessary to change driver assistance technology according to the surrounding conditions. In particular, there is a need for a change in driver assistance technology that assists the driver in response to a positional relationship with other vehicles or a positional relationship with the pedestrians during a turn.

SUMMARY

An aspect of the disclosure provides an advanced driver assistance system capable of outputting information about a risk of collision by determining whether a collision with a pedestrian walking on a turn path during a turn driving, a vehicle having the same, and a method of controlling the vehicle.

Additional aspects of the disclosure will be set forth in part in the description which follows and, in part, will be obvious from the description, or may be learned by practice of the disclosure.

According to an aspect of the disclosure, there is provided an advanced driver assistance system including: a camera configured to obtain an image of a road; and a controller including a processor configured to process the image of the road obtained by the camera. The controller may be configured to generate a first risk of collision region based on a turn path, predict a position of an obstacle based on the processed image information, generate a second risk of collision region based on the predicted position, determine whether or not the obstacle exists in the first and second risk of collision regions based on the processed image information, respectively, adjust a risk level based on the presence or absence of the obstacle in the first and second risk of collision regions, and perform a collision avoidance control corresponding to the adjusted risk level.

In response to determining that the obstacle exists in the first risk of collision region, the controller may be configured to increase a preset risk level by a first size.

The advanced driver assistance system may further include an obstacle detector. The controller may further be configured to, in response to determining whether the obstacle exists in the first risk of collision region, obtain position information of the obstacle based on obstacle information detected by the obstacle detector, and determine whether the obstacle exists in the first risk of collision region based on the obtained position information of the obstacle.

The advanced driver assistance system may further include a communication network configured to communicate with a driving information detector configured to detect driving information of a vehicle. The controller may further be configured to, in response to predicting the position of the obstacle, obtain position information and speed information of the obstacle based on a driving speed and the obstacle information among driving information of the vehicle, obtain a time until collision with the obstacle based on the obtained position information and speed information of the obstacle, and predict the position of the obstacle after the time until the collision with the obstacle.

The advanced driver assistance system may further include a communication network configured to communicate with a driving information detector configured to detect driving information of a vehicle. In response to predicting the position of the obstacle after the time until the collision with the obstacle, the controller may further be configured to predict the position of the obstacle based on the driving speed and a yaw rate among the driving information of the vehicle.

In response to determining that the obstacle exists in the second risk of collision region, the controller may be configured to increase a preset risk level by a second size.

The controller may be configured to generate the first and second risk of collision regions in a funnel shape, a triangular shape, or a trumpet shape.

According to another aspect of the disclosure, there is provided a vehicle including: a camera configured to obtain an image of a road and output image information; an obstacle detector configured to detect an obstacle and output obstacle information; a driving information detector configured to detect driving information of a vehicle; and a controller configured to generate a first risk of collision region based on a turn path, predict a position of the obstacle based on the obstacle information, generate a second risk of collision region based on the predicted position of the obstacle, determine whether the obstacle exists in the first and second risk of collision regions based on the image information, respectively, adjust a risk level based on the presence or absence of the obstacle in the first and second risk of collision regions, and perform a collision avoidance control corresponding to the adjusted risk level.

The controller may be configured to determine whether a section to be driven is a turn section based on navigation information, and in response to determining that the section to be driven is the turn section, generate the turn path based on the image information or map information.

The vehicle may further include an operation lever configured to receive a command to turn on a turn indication lamp. The controller may be configured to, in response to receiving an operation signal from the operation lever, determine whether a section to be driven is a turn section based on navigation information, and in response to determining that the section to be driven is the turn section, generate the turn path based on the image information or map information.

The controller may be configured to, in response to determining that the obstacle exists in the first risk of collision region, increase a preset risk level by a first size, and in response to determining that the obstacle exists in the second risk of collision region, increase the preset risk level by a second size.

The controller is configured to, in response to predicting the position of the obstacle, obtain position information and speed information of the obstacle based on a driving speed and the obstacle information among driving information of the vehicle, obtain a time until collision with the obstacle based on the obtained position information and speed information of the obstacle, and predict the position of the obstacle after the time until the collision with the obstacle based on the driving speed and a yaw rate among the driving information of the vehicle.

According to another aspect of the disclosure, there is provided a method of controlling a vehicle including: determining, by a controller, whether a section to be driven is a turn section; in response to determining that the section to be driven is the turn section, generating, by the controller, a turn path; generating, by the controller, a first risk of collision region based on the generated turn path; predicting, by the controller, a position of an obstacle based on obstacle information detected by an obstacle detector and driving information detected by a driving information detector; generating, by the controller, a second risk of collision region based on the predicted position of the obstacle; based on image information obtained from an imager, determining, by the controller, whether the obstacle exists in the first and second risk of collision regions, respectively; adjusting, by the controller, a risk level based on the presence or absence of the obstacle in the first and second risk of collision regions; and performing, by the controller, a collision avoidance control corresponding to the adjusted risk level.

The determining of whether the section to be driven is the turn section may include determining whether the section to be driven is the turn section based on at least one of an operation signal of an operation lever for lighting a turn indication lamp and navigation information.

The generating of the turn path may include generating the turn path based on the image information or map information.

The generating of the turn path may include generating the turn path based on at least one of a driving speed, a yaw rate, and a steering angle among the driving information of the vehicle.

The adjusting of the risk level may include, in response to determining that the obstacle exists in the first risk of collision region, increasing a preset risk level by a first size; and in response to determining that the obstacle exists in the second risk of collision region, increasing the preset risk level by a second size.

The predicting of the position of the obstacle may include obtaining position information and speed information of the obstacle based on a driving speed and the obstacle information among the driving information; obtaining a time until collision with the obstacle based on the obtained position information and speed information of the obstacle; and predicting the position of the obstacle after the time until the collision with the obstacle based on the driving speed and a yaw rate among the driving information of the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
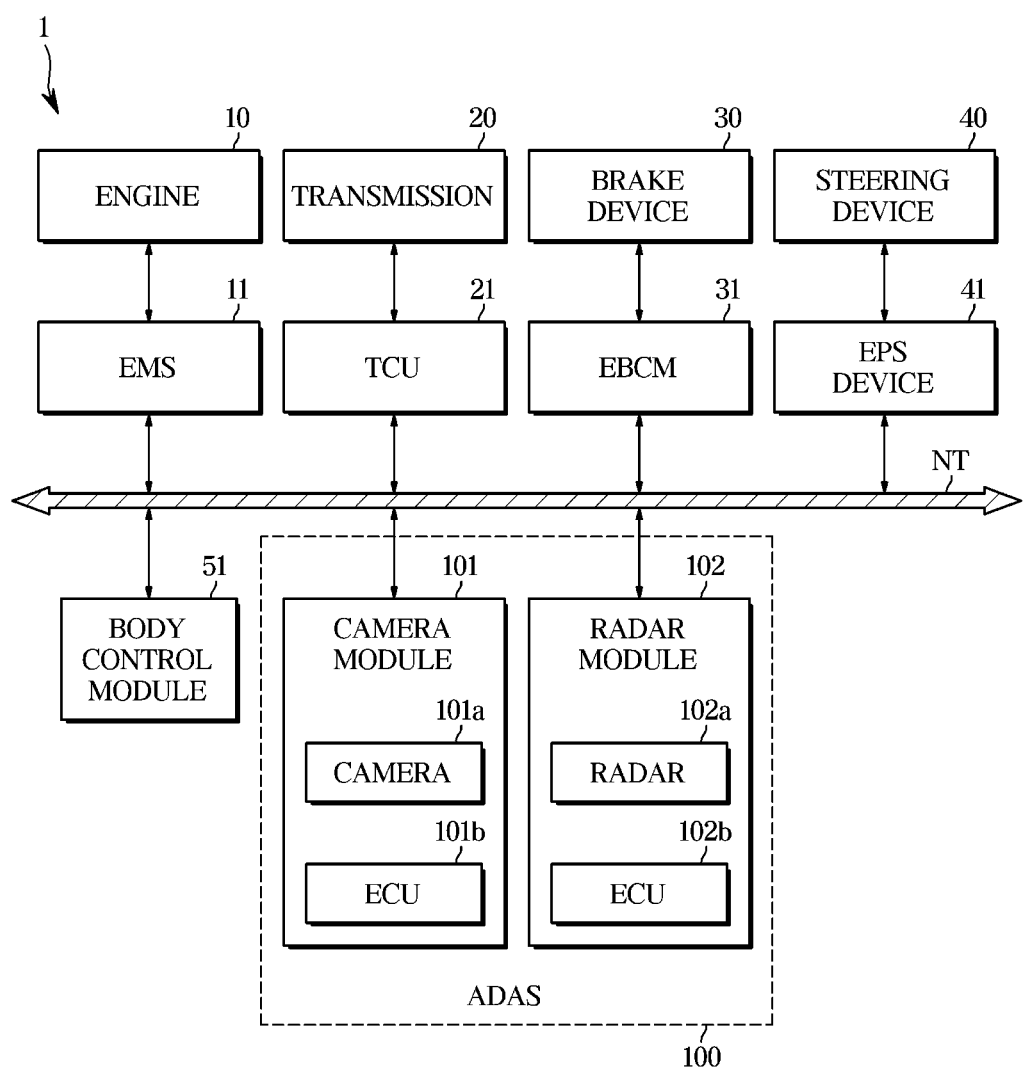
FIG. 1 is a block diagram illustrating a vehicle according to an embodiment.

Like reference numerals refer to like elements throughout the specification. Not all elements of the embodiments of the disclosure will be described, and the description of what are commonly known in the art or what overlap each other in the exemplary embodiments will be omitted.

The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Throughout the specification, when a member is located "on" another member, this includes not only when one member is in contact with another member but also when another member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, operation principles and embodiments of the disclosure will be described with reference to accompanying drawings.

FIG. 1 is a block diagram illustrating a vehicle according to an embodiment.

A vehicle according to the embodiment may be a vehicle that performs a manual driving mode for driving in response to a driver's driving intent and an autonomous driving mode for autonomously driving to a destination.

When driving in the manual driving mode, information about a lane change possibility is output, or when driving in the autonomous driving mode, it may be a vehicle having a lane change assistance device that controls lane change based on the lane change possibility.

Referring to FIG. 1, a vehicle 1 may include an engine 10, a transmission 20, a braking device 30, and a steering device 40.

The engine 10 may include a cylinder and a piston, and may generate power for the vehicle 1 to drive.

The transmission 20 may include a plurality of gears, and may transmit power generated by the engine 10 to wheels.

The braking device 30 may decelerate or stop the vehicle 1 through friction with the wheels.

The steering device 40 may change a driving direction of the vehicle 1.

The vehicle 1 may include a plurality of electrical components.

For example, the vehicle 1 further includes an engine management system (EMS) 11, a transmission control unit (TCU) 21, and an electronic brake control module (EBCM) 31), an electronic power steering (EPS) 41, a body control module (BCM), and an advanced driver assistance system (ADAS).

The EMS 11 may control the engine 10 in response to acceleration intent of the driver through an accelerator pedal or a request of an advanced driver assistance system (ADAS) 100. For example, the EMS 11 may control torque of the engine 10.

The TCU 21 may control the transmission 20 in response to a shift command of the driver through a shift lever and/or a travelling velocity of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS).

The EBCM 31 may selectively release braking of the vehicle wheel in response to over-steering and/or under-steering sensed at a time of steering of the vehicle 1 (electronic stability control, ESC).

In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates the steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The ADAS 100 may assist the driver in manipulating (driving, braking, steering) the vehicle 1. For example, the ADAS 100 may detect a surrounding environment (e.g., another vehicle, a pedestrian, a cyclist, a lane, a road sign, etc.) around the vehicle 1 and control the driving and/or braking and/or steering of the vehicle 1 in response to the sensed surrounding environment.

The ADAS 100 may provide the driver with various functions. For example, the DAS 60 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The ADAS 100 may include a collision avoidance device that outputs notification information about a collision with an obstacle or avoids the obstacle to prevent the collision with the obstacle.

The ADAS 100 may recognizes the road environment by itself, determines obstacles and driving conditions, and controls the vehicle's driving according to the planned driving route based on the position information while avoiding obstacles to autonomously drive to the destination. It may include control functions.

The ADAS 100 may include an autonomous driving control function that allows the vehicle to recognize a road environment by itself, determine the obstacle and a driving situation, and control the driving of the vehicle according to a planned driving path based on the position information while avoiding an obstacle such that the vehicle automatically drives to the destination.

The ADAS 100 may include a camera module 101 for obtaining image data around the vehicle 1 and a radar module 102 for obtaining obstacle data around the vehicle 1.

The camera module 101 may include a camera 101a and an electronic control unit (ECU) 101b, and may photograph the front of the vehicle 1 and recognize other vehicles, pedestrians, cyclists, lanes, road signs, and the like.

The radar module 102 may include a radar 102a and an electronic control unit (ECU) 102b, and may obtain relative positions and relative velocities of obstacles (e.g., other vehicles, pedestrians, cyclists, and the like) around the vehicle 1.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like. Here, the data may include vehicle driving data related to vehicle driving information.

The ADAS 100 may transmit a driving control signal, a braking signal, and a steering signal to the EMS 11, the EBCM 31, and the EPS 41, respectively, through the NT.

Figure 2:
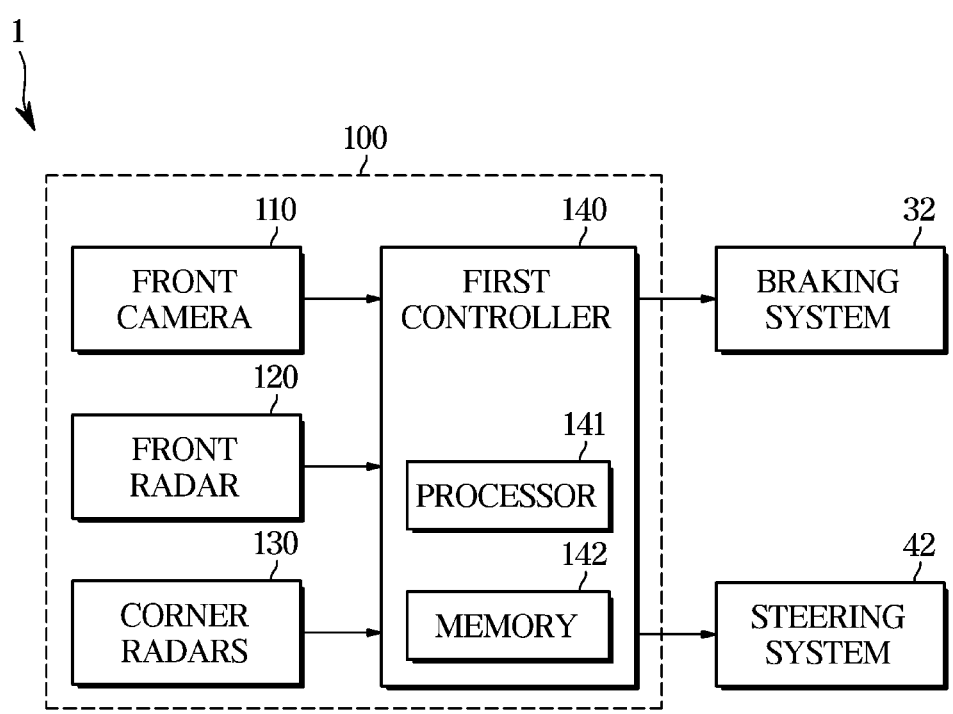
FIG. 2 is a block diagram illustrating an advanced driver assistance system (ADAS) provided in a vehicle according to an embodiment.
Figure 3:
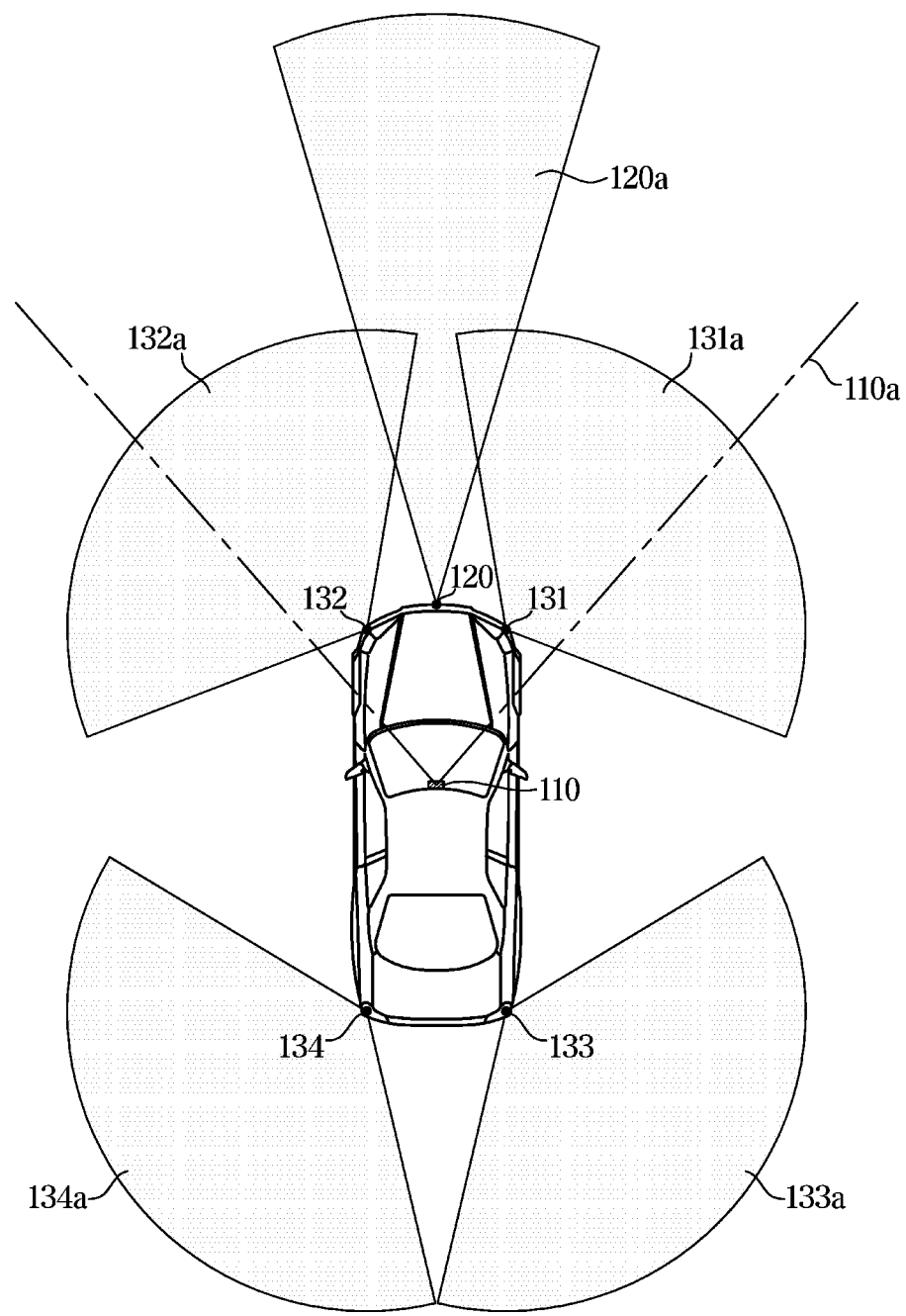
FIG. 3 is a view illustrating an example of a detection area of a camera and a radar included in an ADAS of a vehicle according to an embodiment.

FIG. 2 is a block diagram illustrating an ADAS provided in a vehicle according to an embodiment, and FIG. 3 is a view illustrating an example of a detection area of a camera and a radar included in an ADAS of a vehicle according to an embodiment.

The ADAS according to the embodiment may perform a collision avoidance function for preventing the collision with the obstacle when changing the lane. That is, the ADAS according to the embodiment may represent the collision avoidance device.

Referring to FIG. 2, the vehicle 1 may include a braking system 32, a steering system 42, and the ADAS 100.

The braking system 32 according to the embodiment may include the EBCM 31 (see FIG. 1) and the braking device 30 (see FIG. 1) described in conjunction with FIG. 1, and the steering system 42 may include the EPS 41 (see FIG. 1) and the steering device 40 (see FIG. 1).

The ADAS 100 according to the embodiment may include a front camera 110 as a camera of the camera module 101, and may include a plurality of corner radars 130 (131, 132, 133, and 134) as the radar of the radar module 102.

Referring to FIG. 3, the ADAS 100 may include the front camera 110 configured to have a field of view 110a directed to the front of the vehicle 1, a front radar 120, and the plurality of corner radars 130.

The front camera 110 may be installed on a front windshield of the vehicle 1.

The front camera 110 may image the front of the vehicle 1 and acquire image data regarding the front of the vehicle 1. The image data regarding the front of the vehicle 1 may include position information of at least one of another vehicle, a pedestrian, a cyclist, a lane, a curb, a guard rail, a roadside tree, a street lamp, or the like existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a first controller 140. For example, the front camera 110 may be connected to the first controller 140 through a vehicle communication network NT, through a hard wire, or through a printed circuit board (PCB).

The front camera 110 may transmit the image data of the front of the vehicle 1 to the first controller 140.

The front radar 120 may have a field of sensing 120a directed to the front of the vehicle 1. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle.

The front radar 120 may acquire front radar data from the transmission radio waves transmitted by the transmission antenna and the reflection radio waves received by the reception antenna.

Front radar data may include position information and velocity information regarding an obstacle, such as another vehicle, a pedestrian, or a cyclist existing in front of the vehicle 1.

The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves.

The front radar 120 may be connected to the first controller 140 through a vehicle communication network NT, a hard wire, or a printed circuit board. The front radar 120 may transmit the front radar data to the first controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1. The first corner radar 131 may be installed on the right side of a front bumper of the vehicle 1.

The second corner radar 132 may have a field of sensing 132a directed to the front left side of the vehicle 1, and may be installed on the left side of the front bumper of the vehicle 1.

The third corner radar 133 may have a field of sensing 133a directed to the rear right side of the vehicle 1 and may be installed on the right side of a rear bumper of the vehicle 1.

The fourth corner radar 134 may have a field of sensing 134a directed to the rear left side of the vehicle 1 and may be installed on the left side of the rear bumper of the vehicle 1.

Each of the first, second, third and fourth corner radars 131, 132, 133, and 134 may include a transmission antenna and a reception antenna.

The first, second, third, and fourth corner radars 131, 132, 133 and 134 acquire first corner radar data, second corner radar data, third corner radar data, and fourth corner radar data, respectively.

The first corner radar data may include distance information and velocity information regarding another vehicle, a pedestrian or a cyclist (hereinafter, referred to as the obstacle) existing on the front right side of the vehicle 1.

The second corner radar data may include distance information and velocity information regarding an obstacle existing on the front left side of the vehicle 1.

The third and fourth corner radar data may respectively include distance and velocity information regarding an obstacle existing on the rear right side of the vehicle 1 and distance and velocity information regarding an object located on the rear left side of the vehicle 1, respectively.

Each of the first, second, third, and fourth corner radars 131, 132, 133 and 134 may be connected to the first controller 140, for example, through the vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the first controller 140.

The first controller 140 may include the ECU 101b (see FIG. 1) of the camera module 101 (see FIG. 1) and/or the ECU 102b (see FIG. 1) of the radar module 102 (see FIG. 1), and/or an integrated ECU.

The first controller 140 includes a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42.

For example, the processor 141 may include an image signal processor for processing the front image data of the front camera 110 and/or a digital signal processor for processing radar data of the radars 120 and 130 and/or a micro control unit (MCU) for generating a braking signal and/or a steering signal.

The processor 141 may detect obstacles (e.g., another vehicle, a pedestrian, a cyclist, a curb, a guard rail, a roadside tree, a street lamp, and the like) in front of the vehicle 1 based on the front image data of the front camera 110 and the front radar data of the radar 120.

In detail, the processor 141 may acquire position information (distance and direction) and velocity information (relative velocity) of the obstacles in front of the vehicle 1 based on the front radar data of the front radar 120. The processor 141 may acquire position information (direction) and type information (for example, whether the obstacle is another vehicle, a pedestrian, a cyclist, a curb, a guard rail, a roadside tree, a street lamp, or the like) of the obstacle existing in front of the vehicle 1 based on the front image data of the front camera 110.

In addition, the processor 141 may match the obstacles detected by the front image data with the obstacles detected by the front radar data, and acquire the type information, the position information, and the velocity information of the obstacles in front of the vehicle 1 based on a result of the matching.

The processor 141 may generate a braking signal and a steering signal based on the type information, the position information, and the velocity information of the front obstacles.

For example, the processor 141 calculates a time to collision (TTC) between the vehicle 1 and the front obstacle based on the position information (relative distance) and the velocity information (relative velocity) of the front objects, and warns the driver of a collision, transmits a braking signal to the braking system 32, or transmits a steering signal to the steering system 42 based on a result of comparing the TTC with a predetermined reference time.

In response to the TTC less than a predetermined first reference time, the processor 141 may allow an alert to be output via audio and/or display.

In response to the TTC less than a predetermined second reference time, the processor 141 may transmit a preliminary-braking signal to the braking system 32.

In response to the TTC less than a predetermined third reference time, the processor 141 may transmit an emergency braking signal to the braking system 32. In this case, the second reference time is shorter than the first reference time, and the third reference time is shorter than the second reference time.

The processor 141 may transmit a steering signal to the steering system 42 based on the direction information of the position information of the front obstacles.

As another example, the processor 141 may calculate a distance to collision (DTC) based on the velocity information (e.g., relative velocity) of front objects, and warn the driver of a collision or transmit a braking signal to the braking system 32 based on a result of comparing the DTC with distances to the front objects.

The processor 141 may acquire position information (distance and direction) and velocity information (relative velocity) of the obstacles on the sides of the vehicle 1 (front right, front left, rear right, and rear left) based on corner radar data of the plurality of corner radars 130.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

Figure 4:
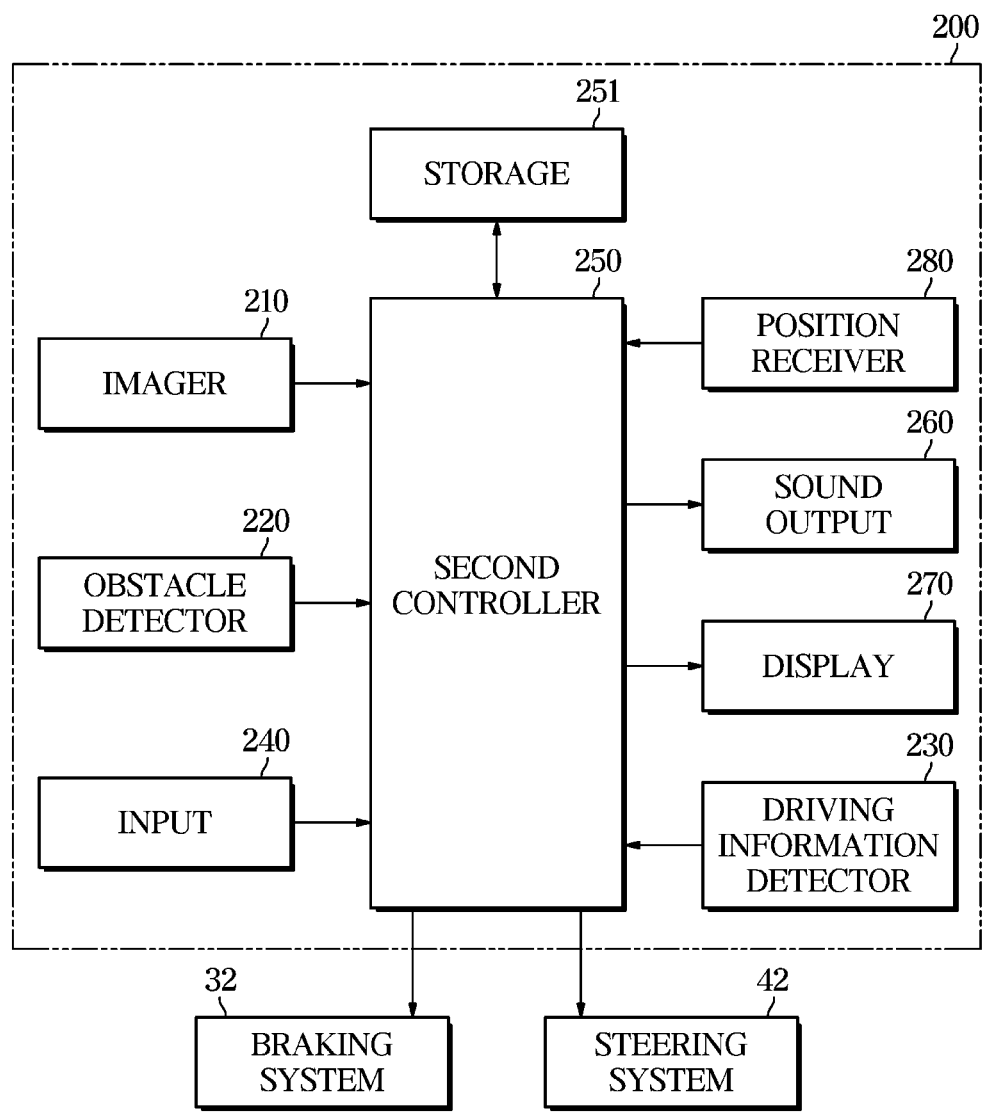
FIG. 4 is a control block diagram illustrating a collision avoidance device of an ADAS provided in a vehicle according to an embodiment.

FIG. 4 is a control block diagram illustrating a collision avoidance device of an ADAS provided in a vehicle according to an embodiment.

A collision avoidance device 200 of the ADAS 100 may include an imager 210, an obstacle detector 220, a driving information detector 230, an input 240, a second controller 250, a storage 251, a sound output 260, and a display 270, and may further include the braking system 32 and the steering system 42.

The imager 210 may obtain an image of a road and transmit information of the obtained image to the second controller 250. Here, the image information may be image data.

The imager 210 may include the front camera 110, obtain the image information of the road from front image data captured by the front camera 110, and obtain a shape of the obstacle.

Here, the image information of the road may include a lane image and an image of another vehicle.

In addition, the shape of the obstacle may be information for recognizing a type of the obstacle. In addition, it is also possible to obtain position information and speed information of the obstacle from the image data captured by the front camera 110.

The obstacle detector 220 may detect obstacles in the front and left and right sides of a subject vehicle, and transmit obstacle information about the detected obstacle to the second controller 250. Here, the obstacle information may include position information of the obstacle, and the position information of the obstacle may include a distance to the obstacle and a direction of the obstacle.

The obstacle detector 220 may include the front radar 120 and first and second corner radars 131 and 132.

In addition, the obstacle detector 220 may include a Light Detection And Ranging (LiDAR) sensor. The LiDAR sensor is a non-contact distance detection sensor using a principle of laser radar. The LiDAR sensor may include a transmitter that transmits a laser, and a receiver that receives the laser that returns after being reflected on a surface of an object existing within a sensor range.

The obstacle detector 220 may include an ultrasonic sensor.

The ultrasonic sensor may generate ultrasonic waves for a certain period of time and then detect a signal that is reflected on the object and returned. The ultrasonic sensor may be used to determine the presence or absence of the obstacle such as the pedestrian within a short range.

The driving information detector 230 may detect driving information of the vehicle 1 such as driving speed information, driving direction information, and yaw rate information. Here, the driving information of the vehicle 1 may be information on a driving speed, a driving direction, and a driving distance of the vehicle 1.

The driving information detector 230 may include at least one of a speed detector, a steering angle detector, and a yaw rate detector.

The speed detector may include a plurality of wheel speed sensors. The speed detector may include an acceleration sensor. The speed detector may include a plurality of wheel speed sensors and acceleration sensors.

When the speed detector is the acceleration sensor, the second controller 250 may obtain the acceleration of the subject vehicle based on the information detected by the acceleration sensor, and obtain the driving speed of the subject vehicle based on the obtained acceleration.

When the speed detector is the acceleration sensor and the plurality of wheel speed sensors, the second controller 250 may obtain the acceleration of the subject vehicle based on the information detected by the acceleration sensor, and obtain the driving speed of the subject vehicle based on the speed information obtained by the plurality of wheel speed sensors.

The input 240 may receive a user input.

The input 240 may receive an operation command for any one of functions that can be performed in the vehicle 1. For example, the input 240 may receive an operation command of at least one of a radio function, an audio function, a video function, a map display function, a navigation function, a DMB function, a content playback function, and an internet search function.

The input 240 may receive either the manual driving mode in which the driver directly drives the vehicle 1 or the autonomous driving mode in which the driver drives automatically, and may transmit the input signal to the second controller 250.

The input 240 may receive destination information while performing the autonomous driving mode or a navigation mode, and may receive information about a path for at least one of a plurality of paths.

The input 240 may also receive input of the driving speed in the autonomous driving mode.

The input 240 may receive an on-off command of a collision avoidance notification mode indicating a possibility of collision with the obstacle. The input 240 may also receive an on-off command of an intersection collision avoidance assistance mode.

The input 240 may be provided in a head unit or a center fascia in the vehicle 1, or may be provided in a vehicle terminal. The input 240 may be provided as a button, a key, a switch, an operation lever, a jog dial, or the like, or may be provided as a touch pad.

In the navigation mode or the autonomous driving mode, the second controller 250 may generate a path from a current position to the destination based on current position information and the destination information received by a position receiver 280 and control driving with the generated path.

When the plurality of paths are generated, the second controller 250 may control driving based on information about the path selected by the input 240 among the plurality of paths.

The second controller 250 may control to drive at a preset driving speed when performing the autonomous driving mode or control to drive at the driving speed input by the user.

The second controller 250 may control the display 270 to generate navigation information by matching the generated path information and the current position information with map information, and to display the generated navigation information.

The second controller 250 may recognize the lane of the road and the obstacle by performing image processing on the image information obtained by the imager 210 while autonomous driving, and recognize the subject vehicle on which the subject vehicle is driving based on the recognized position information of the lane. The second controller 250 may obtain the distance to the obstacle recognized based on the obstacle information detected by the obstacle detector 220 and control lane change, acceleration, and deceleration based on the obtained distance to the obstacle.

The second controller 250 may determine whether a driving section is a turn section based on the path information during the execution of the autonomous driving mode. When it is determined that a section to be driven is the turn section, the second controller 250 may determine whether there is the collision with the pedestrian in the turn section using the image information obtained by the imager 210 and the obstacle information obtained by the obstacle detector 220.

The section to be driven may be a section within a preset distance from the current position.

The section to be driven may be a section in which turn notification information is output among the navigation information.

The turn section may include a left turn section between a position where a left turn starts and a position where the left turn ends, and may include a right turn section between a position where a right turn starts and a position where the right turn ends.

The second controller 250 may determine whether the section to be driven is the turn section based on the navigation information when the collision avoidance notification mode is selected while the manual driving mode is being performed or the intersection collision avoidance assistance mode is selected. When it is determined that the section to be driven is the turn section, the second controller 250 may determine whether there is the collision with the pedestrian in the turn section using the image information obtained by the imager 210 and the obstacle information obtained by the obstacle detector 220.

The second controller 250 may determine whether there is the collision with the pedestrian in the turn section using the image information obtained by the imager 210 and the obstacle information obtained by the obstacle detector 220 when a turn command is received through the input 240 while performing the manual driving mode. Here, the turn command received by the input 240 may include a left turn command and a right turn command by the operation lever.

When it is determined that a turn indication lamp is turned on while performing the manual driving mode, the second controller 250 may determine whether there is the collision with the pedestrian in the turn section using the image information obtained by the imager 210 and the obstacle information obtained by the obstacle detector 220. Here, the turn indication lamp may include a left turn indication lamp and a right turn indication lamp.

The pedestrian in the turn section may be the pedestrian crossing the road, may be a cyclist, or may be a personal mobility user.

The pedestrian in the turn section may be the pedestrian crossing the road at a diagonal position with the vehicle 1 before turning.

Figure 5:
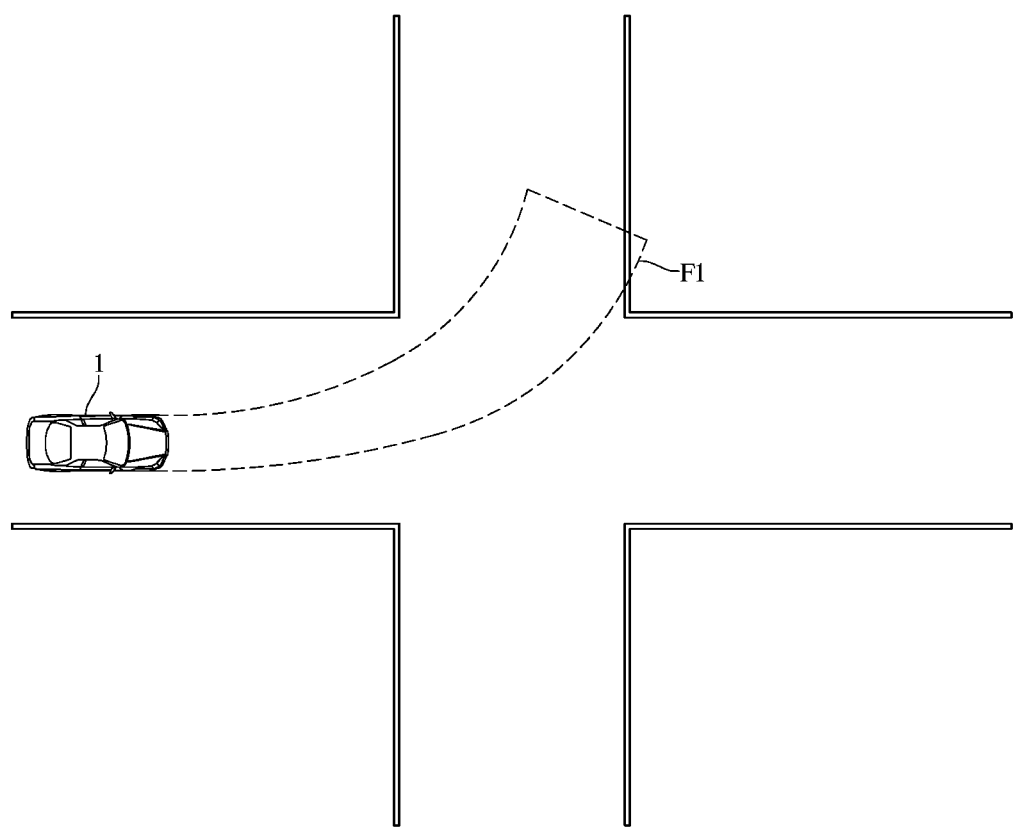
FIGS. 5, 6, 7 and 8 are views for predicting a collision of a vehicle according to an embodiment.

Referring to FIG. 5, when determining whether there is the collision with the pedestrian within the turn section, the second controller 250 may generate the turn path based on at least one of steering angle information, driving speed information, and yaw rate information detected by the driving information detector 230, and may generate a first risk of collision region F1 corresponding to the generated turn path.

When generating the turn path, the second controller 250 may additionally use the map information or the navigation information.

The first risk of collision region may be generated in a funnel shape, or a triangular shape or a trumpet shape.

In addition, when determining whether there is the collision with the pedestrian in the turn section, the second controller 250 may generate the turn path based on the navigation information and generate the first risk of collision region corresponding to the generated turn path.

When determining whether there is the collision with the pedestrian within the turn section, the second controller 250 may generate the turn path based on the map information and generate the first risk of collision region corresponding to the generated turn path.

The second controller 250 may increase a preset risk by a first size when it is determined that there is the pedestrian in the generated first risk of collision region, and maintain the preset risk when it is determined that there is no the pedestrian in the generated first risk of collision region.

When determining whether the pedestrian exists in the first risk of collision region, the second controller 250 may recognize the image for the first risk of collision region from the image obtained by the imager 210 and recognize the pedestrian in the image for the recognized first risk of collision region. At this time, if the pedestrian is recognized, the second controller 250 may determine that the pedestrian exists in the first risk of collision region. If the pedestrian is not recognized, the second controller 250 may determine that the pedestrian does not exist in the first risk of collision region.

When determining whether the pedestrian exists in the first risk of collision region, the second controller 250 may recognize a moving obstacle in the first risk of collision region based on the obstacle information detected by the obstacle detector 220. When it is determined that the moving obstacle is recognized, the second controller 250 may determine that the pedestrian exists in the first risk of collision region, and when no moving obstacle is recognized, the second controller 250 may determine that there is no pedestrian in the first risk of collision region.

The second controller 250 may determine whether the pedestrian exists around the turn section based on the image information obtained by the imager 210. When it is determined that there is the pedestrian around the turn section, the second controller 250 may obtain the position information (relative distance) and speed information (relative speed) of the pedestrian based on the obstacle information detected by the obstacle detector 220, and may obtain a time to collision (TTC) between the vehicle 1 and the pedestrian.

The second controller 250 may obtain the position information of the pedestrian after the time until the collision obtained based on the position information (relative distance) and the speed information (relative speed) of the pedestrian, and may generate a second risk of collision region F2 based on the obtained position information of the pedestrian.

The second risk of collision region may be generated in the funnel shape, or the triangular shape or the trumpet shape.

That is, the second controller 250 may predict the position information of the pedestrian after the time until the collision ($d_{long}+V_{x,T} \Delta T$, $d_{lat}+V_{y,T} \Delta T$) based on a relative longitudinal distance, a relative traverse distance, a longitudinal distance of the pedestrian, a traverse distance of the pedestrian, and an amount of change in time.

Figure 6:
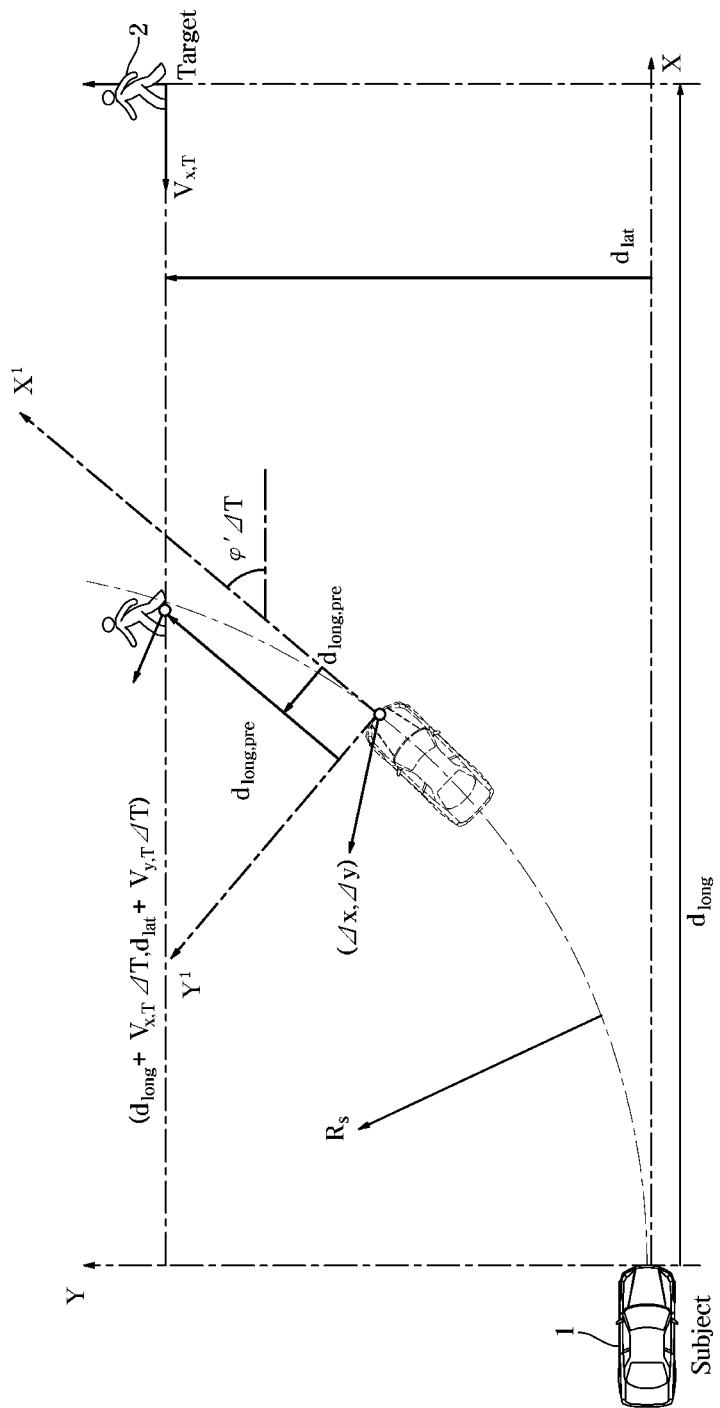
Figure 7:
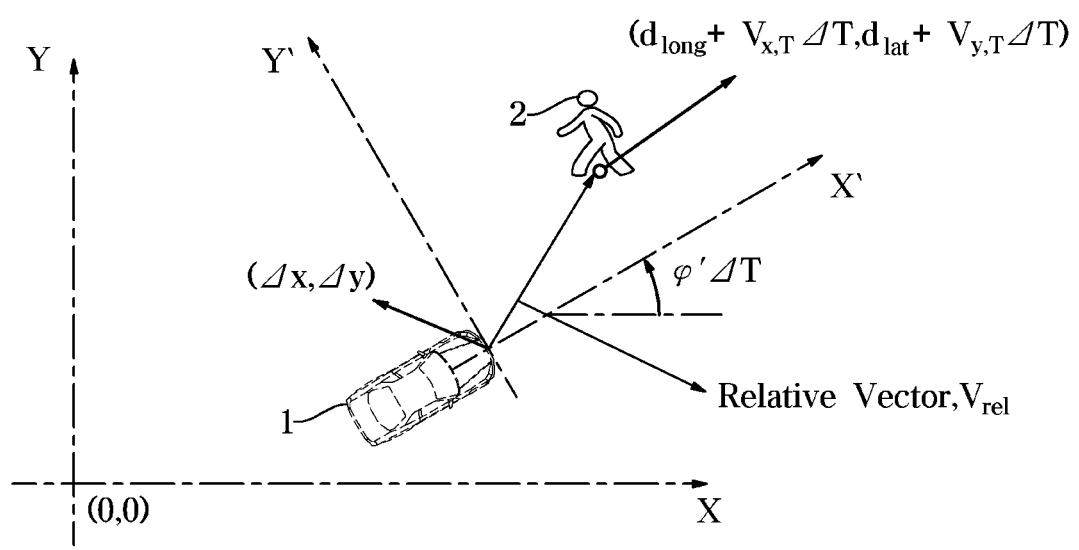

More particularly, as illustrated in FIGS. 6 and 7, the second controller 250 may obtain a relative vector Vrel for the current coordinates of the pedestrian based on a deviation of a longitudinal distance of the vehicle 1 and a deviation of a traverse distance of the vehicle 1.

$$Vrel=(d_{long}+V_{x,T}\Delta T-\Delta x, d_{lat}+V_{y,T}\Delta T-\Delta y)=(X,Y)$$

$$\Delta x = Rs\ \sin((V_{x,s}/Rs)*\Delta T), \Delta y=\Delta x^2/2Rs$$

$d_{long}$: relative longitudinal distance
$d_{lat}$: relative traverse distance
$\Delta T$: amount of change in time
Rs: turning radius of the vehicle
$\Delta x$: deviation of a longitudinal distance of the vehicle
$\Delta y$: deviation of a traverse distance of the vehicle
$V_{x,s}$: longitudinal speed of the vehicle
$\Phi'$: yaw rate of the vehicle
$V_{x,T}$: longitudinal speed of the pedestrian
$V_{y,T}$: traverse speed of the pedestrian The second controller 250 may predict a future position of the pedestrian after the time until the collision based on the relative vector Vrel with respect to the pedestrian's current coordinates and the yaw rate according to the amount of change in time. At this time, the predicted future position of the pedestrian may be obtained as a relative vector Vpre for the future coordinates of the pedestrian.

$$Vpre = (d_{long,pre}, d_{lat,pre}) =$$
$$(X\cos(\Phi' \Delta T) + Y\sin(\Phi' \Delta T), -X\sin(\Phi' \Delta T) + Y\cos(\Phi'\Delta T))$$
$$d_{long,pre} = X\cos(\Phi' \Delta T) + Y\sin(\Phi' \Delta T) =$$
$$(d_{long} + V_{x,T} \Delta T - \Delta x)\cos(\Phi' \Delta T) + (d_{lat} + V_{y,T}\Delta T - \Delta y)\sin(\Phi'\Delta T)$$
$$d_{lat,pre} =$$
$$-(d_{long} + V_{x,T}\Delta T - \Delta x)\sin(\Phi'\Delta T) + (d_{lat} + V_{y,T}\Delta T - \Delta y)\cos(\Phi'\Delta T)$$

The second controller 250 may obtain a longitudinal distance ($d_{long,\ pre}$) and a traverse distance ($d_{lat,\ pre}$) corresponding to the vector relative for the pedestrian's future coordinates.

The second controller 250 may obtain the relative longitudinal speed ($V_{longRel,\ SF}$) and the relative traverse speed ($V_{latRel,\ SF}$) based on the longitudinal distance ($d_{long,\ pre}$), traverse distance ($d_{lat,\ pre}$), and the amount of change in time, and may obtain the longitudinal speed of the pedestrian and the traverse speed of the pedestrian based on the relative longitudinal speed, the relative traverse speed, the traverse speed of the vehicle 1, the longitudinal speed of the vehicle 1, and the yaw rate.

$$\cdot V_{longRel} = \lim_{\Delta T \to 0} \frac{d_{long,pre} - d_{long}}{\Delta T} = V_{x,T} - V_{x,S} + d_{lat}\varphi'$$

$$\cdot V_{latRel,SF} = \lim_{\Delta T \to 0} \frac{d_{lat,pre} - d_{lat}}{\Delta T} = V_{y,T} - d_{long}\varphi'$$

$$V_{x,T} = V_{longRel,SF} + V_{x,S} - d_{lat}\varphi'$$

$$V_{y,T} = V_{latRel,SF} + V_{y,S} + d_{long}\varphi'$$

The second controller 250 may obtain the longitudinal speed of the pedestrian and the traverse speed of the pedestrian, and predict the position of the pedestrian based on the obtained longitudinal speed of the pedestrian, traverse speed of the pedestrian, relative longitudinal distance, relative traverse distance, and the amount of change in time.

Figure 8:
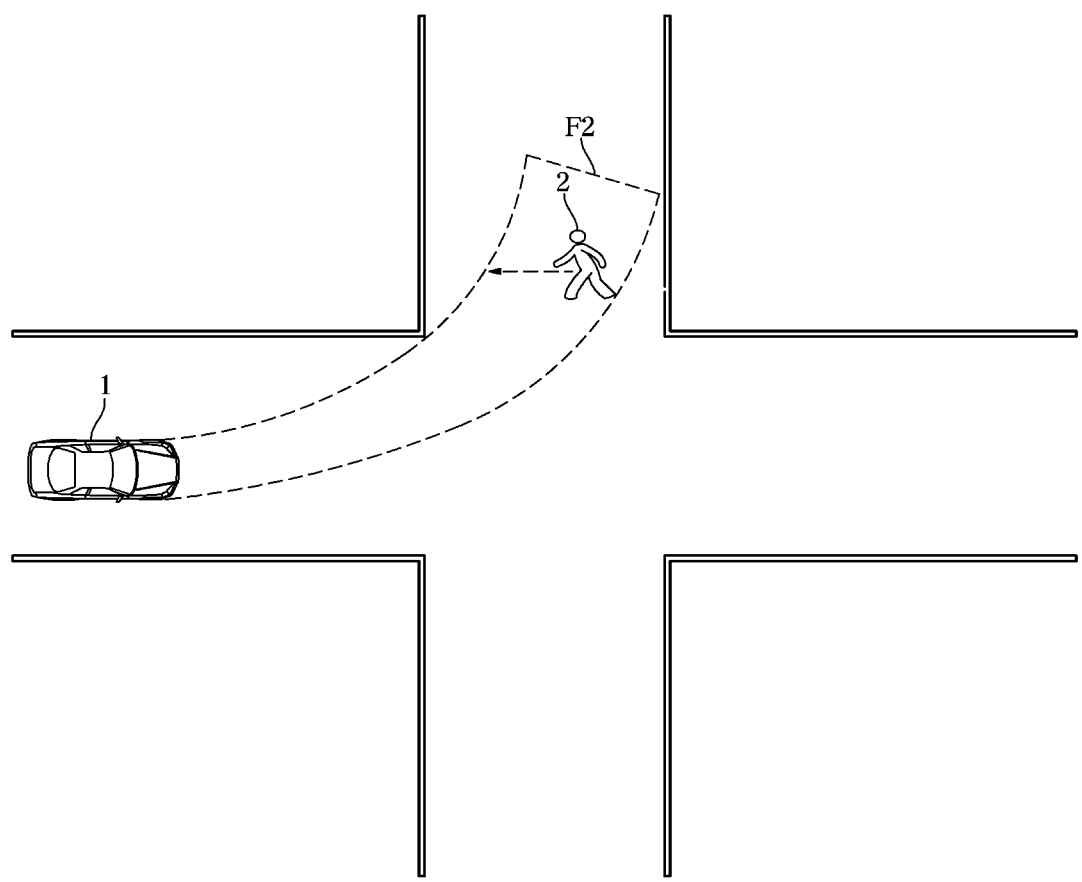

Referring to FIG. 8, the second controller 250 may generate a second risk of collision region F2 based on information about the predicted pedestrian's position.

The second controller 250 may increase the preset risk by a second size when it is determined that there is the pedestrian in the generated second risk of collision region, and maintain the preset risk when it is determined that there is no the pedestrian in the generated second risk of collision region.

When determining whether the pedestrian exists in the second risk of collision region, the second controller 250 may recognize the image for the second risk of collision region from the image obtained by the imager 210 and recognize the pedestrian in the image for the recognized second risk of collision region. At this time, if the pedestrian is recognized, the second controller 250 may determine that the pedestrian exists in the second risk of collision region. If the pedestrian is not recognized, the second controller 250 may determine that the pedestrian does not exist in the second risk of collision region.

When determining whether the pedestrian exists in the second risk of collision region, the second controller 250 may recognize a moving obstacle in the second risk of collision region based on the obstacle information detected by the obstacle detector 220. When it is determined that the moving obstacle is recognized, the second controller 250 may determine that the pedestrian exists in the second risk of collision region, and when no moving obstacle is recognized, the second controller 250 may determine that there is no pedestrian in the second risk of collision region.

The second controller 250 may control at least one of the display 270 and the sound output 260 to output warning information notifying a caution of collision with the pedestrian.

When controlling at least one of the display 270 and the sound output 260 to output the warning information notifying the caution of collision with the pedestrian, the second controller 250 may identify a risk level and adjust a volume of a warning sound based on the identified risk level, adjust an interval of the warning sound, or adjust a warning indication on the display 270.

For example, the second controller 250 may control the volume of the warning sound to increase as the risk level increases, and may control a screen color of the display 270 to become redder as the risk level increases.

When performing the turn driving, the second controller 250 may identify the risk level and change the deceleration amount or control steering based on the identified risk level. For example, the second controller 250 may control the reduction amount to increase as the risk level increases.

When performing the turn driving, the second controller 250 may control a lighting of an emergency light based on the identified risk level.

When controlling the turn driving, the second controller 250 may determine whether there is a collision with another vehicle and control the output of collision information regarding whether there is the collision with another vehicle.

The second controller 250 may recognize a position change of the pedestrian based on the image information of the imager 210 periodically received during turn driving control, recognize a position change of the vehicle 1 based on the driving information detected by the driving information detector 230, and predict the position of the pedestrian based on the change in the position of the vehicle 1 and the position of the pedestrian.

The second controller 250 may communicate with the braking system 32 and the steering system 42.

The braking system 32 may perform braking in response to a braking signal of the second controller 250 prevent the collision with another vehicle.

The braking system 32 may perform emergency braking based on the braking signal of the second controller 250.

The steering system 42 may perform steering to adjust a driving path in response to a steering signal of the second controller 250.

The storage 251 may store information about the first size corresponding to the first risk of collision region and information about the second size corresponding to the second risk of collision region.

The storage 251 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory; a volatile memory element, e.g., a Random Access Memory (RAM); or a storage medium, e.g., a Hard Disk Drive (HDD) and a CD-ROM. The implementation of the storage is not limited thereto.

The storage 251 may be a memory that is implemented by a separate memory chip from the aforementioned processor related to the second controller 250 or the storage 251 may be implemented by a single chip with a processor.

The sound output 260 outputs the sound in response to a control command of the second controller 250.

The sound output 260 may output the warning information as the sound so as to be careful about the collision with the pedestrian during the turn driving. The sound output 260 may be a speaker.

The display 270 may display the operation information about a function being performed.

For example, the display 270 may display information related to a phone call, display content information output through a terminal, or display information related to a music playback, and display external broadcasting information.

The display 270 may display the map information, and may display the map information and road guidance information in which the path to the destination is matched.

If there are the plurality of paths to the destination, the display 270 may display a driving time and a driving distance corresponding to each path to facilitate selection by the user.

The display 270 may display the autonomous driving mode or the manual driving mode, and may display on-off information of the collision avoidance notification mode. The display 270 may also display on-off information of the intersection collision avoidance assistance mode.

The display 270 may display the image of the road or display the position information of the pedestrian.

The display 270 may display control information for avoiding collision with the pedestrian as the image. Here, the control information may include deceleration information and steering information.

The display 270 may display the image, turn on or turn off, in response to the control command of the second controller 250.

The display 270 may change a background color in response to the control command of the second controller 250.

The display 270 may be a lamp such as a light emitting diode (LED) or a flat panel display device such as a liquid crystal display (LCD).

The display 270 may be a display panel to be provided in the vehicle terminal.

The display 270 may display rotatable and non-rotatable information as text or emoticons. The display 270 may display an image when the turn is possible and an image when the turn is not possible in different colors.

The position receiver 280 may receive the position information of the subject vehicle and transmit the received position information to the first controller 140.

The position receiver 280 may include a global positioning system (GPS) receiver that calculates the position of the subject vehicle by performing communication with a plurality of satellites.

Figure 9:
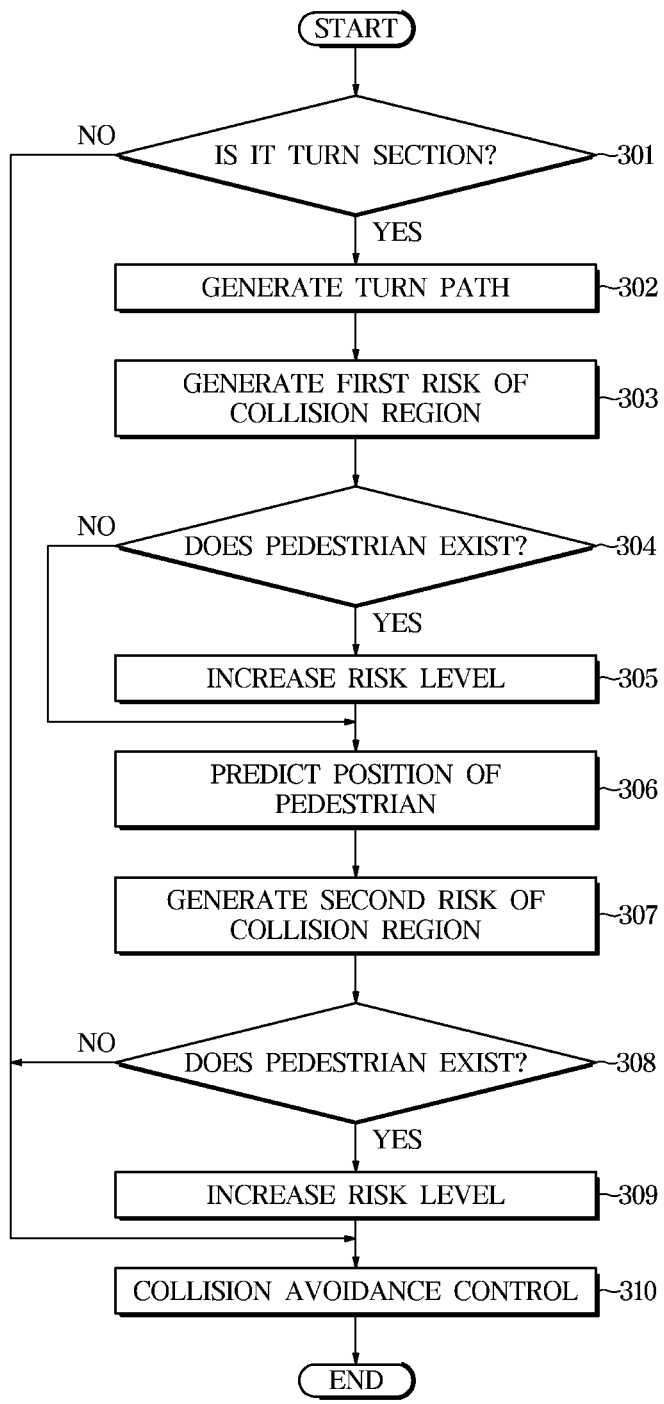
FIG. 9 is a flowchart illustrating a vehicle control according to an embodiment.

FIG. 9 is a control flowchart of a collision avoidance device provided in a vehicle according to an embodiment.

The vehicle 1 may determine whether the section to be driven is the turn section while driving (301).

Determining whether it is the turn section may include determining whether the section to be driven is the turn section based on the path information during execution of the autonomous driving mode.

Determining whether the section is the turn section may include determining whether the section to be driven is the turn section based on the navigation information in a state in which the collision avoidance notification mode is selected while the manual driving mode is performed or the intersection collision avoidance assist mode is selected.

Determining whether the section is the turn section may include determining that the section to be driven is the turn section when the turn command is received through the input 240 while performing the manual driving mode. Here, the turn command received by the input 240 may include a left turn command and a right turn command by the operation lever.

Determining whether the section is the turn section may include determining that the section to be driven is the turn section when it is determined that the turn indication lamp is turned on by the operation of the operation lever while performing the manual driving mode. Here, the turn indication lamp may include the left turn indication lamp and the right turn indication lamp.

Next, when it is determined that the section to be driven is the turn section, the vehicle 1 may generate the turn path based on at least one of steering angle information, driving speed information, and yaw rate information detected by the driving information detector 230 (302), and may generate the first risk of collision region F1 corresponding to the obtained turn path (303).

When generating the turn path, the vehicle 1 may additionally use the map information or the navigation information.

When generating the first risk of collision region, the first risk of collision region may be generated in the funnel shape, or the triangular shape or the trumpet shape.

The vehicle 1 may determine whether the pedestrian exists in the first risk of collision region (304). When it is determined that the pedestrian exists in the first risk of collision region, the vehicle 1 may increase the preset risk level by the first size (305). When it is determined that there is no the pedestrian in the first risk of collision region, the vehicle 1 may maintain the preset risk level.

Determining whether the pedestrian exists in the first risk of collision region may include recognizing the image for the first risk of collision region in the image obtained by the imager 210 and recognizing the pedestrian in the image for the recognized first risk of collision region. In this case, if the pedestrian is recognized, determining whether the pedestrian exists in the first risk of collision region may include determining that the pedestrian exists in the first risk of collision region. If the pedestrian is not recognized, determining whether the pedestrian exists in the first risk of collision region may include determining that there is no the pedestrian in the first risk of collision region.

Determining whether the pedestrian exists in the first risk of collision region may include recognizing the obstacle moving in the first risk of collision region based on the obstacle information detected by the obstacle detector 220. When it is determined that the moving obstacle is recognized, it is determined that the pedestrian exists in the first risk of collision region. When it is determined that the moving obstacle is not recognized, it is determined that the pedestrian does not exist in the first risk of collision region.

When it is determined that there is the pedestrian around the turn section, the next vehicle may obtain the position information (relative distance) and the speed information (relative speed) of the pedestrian based on the obstacle information detected by the obstacle detector 220. The next vehicle may obtain the TTC between the vehicle 1 and the pedestrian based on the obtained position information (relative distance) and speed information (relative speed), and predict the position of the pedestrian after the time until the collision (306).

At this time, the vehicle 1 may predict the position information of the pedestrian after the time until the collision obtained based on the speed information (traverse speed, longitudinal speed) of the vehicle 1 and yaw rate, and the position information (relative distance) and speed information (relative speed) of the pedestrian (see FIGS. 6 and 7), and may generate the second risk of collision region F2 based on the predicted position information of the pedestrian (307).

The next vehicle may determine whether the pedestrian exists in the second risk of collision region (308). When it is determined that the pedestrian exists in the second risk of collision region, the next vehicle may increase the preset risk level by the second size (309), and may maintain the preset risk level when it is determined that there is no the pedestrian in the generated second risk of collision region.

Determining whether the pedestrian exists in the second risk of collision region may include recognizing the image for the second risk of collision region in the image obtained by the imager 210 and recognizing the pedestrian in the image for the recognized second risk of collision region. In this case, if the pedestrian is recognized, determining whether the pedestrian exists in the second risk of collision region may include determining that the pedestrian exists in the second risk of collision region. If the pedestrian is not recognized, determining whether the pedestrian exists in the second risk of collision region may include determining that there is no the pedestrian in the second risk of collision region.

Determining whether the pedestrian exists in the second risk of collision region may include recognizing the obstacle moving in the second risk of collision region based on the obstacle information detected by the obstacle detector 220. When it is determined that the moving obstacle is recognized, it is determined that the pedestrian exists in the second risk of collision region. When it is determined that the moving obstacle is not recognized, it is determined that the pedestrian does not exist in the second risk of collision region.

The vehicle 1 may identify the risk level and output the warning information notifying the caution of collision with the pedestrian based on the identified risk level.

The vehicle 1 may be controlled so that the volume of the warning sound increases as the identified risk level increases, and the color of the screen of the display 270 becomes redder as the risk level increases.

The vehicle 1 may control the output of the warning sound and the display 270 based on a difference between the identified risk level and the preset risk level.

The vehicle 1 may identify the risk level and control the deceleration amount based on the identified risk level. For example, the vehicle 1 may be controlled to increase the amount of reduction as the risk level increases.

The vehicle 1 may sum the first size and the second size and perform control for preventing the collision with the pedestrian based on the summed size (310).

According to the embodiments of the disclosure, it is possible to prevent the collision with the pedestrian walking in a region that is difficult for a driver to recognize by determining whether the collision with the pedestrian walking in the turn path occurs during turn driving and outputting information about a risk of collision. Accordingly, the disclosure may increase the safety of the vehicle and reduce a risk of traffic accidents.

The disclosure adjusts the risk of collision with the pedestrian based on a time until the collision with the pedestrian crossing the road in a diagonal direction during turn driving, and performs collision avoidance control based on the adjusted collision risk, thereby increasing the accuracy of pedestrian recognition. And, it is possible to increase the control precision according to the risk of collision with the pedestrian.

According to the disclosure, it is possible to determine whether the collision with the pedestrian using only the imager and the obstacle detector in a state in which a hardware configuration is not added, thereby preventing an increase in vehicle cost and improving vehicle stability.

As described above, the disclosure may improve the quality and marketability of vehicles having ADAS and ADAS, and further enhance user satisfaction and secure product competitiveness.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. An advanced driver assistance system comprising:
   a camera configured to obtain an image of a road; and
   a controller including a processor configured to process the image of the road obtained by the camera,
   wherein the controller is configured to:
   generate a first risk of collision region based on a turn path;
   predict a first position of an obstacle based on the processed image information;
   determine whether the obstacle exists in the first risk of collision region based on the processed image information;
   adjust a risk level based on the presence of the obstacle in the first risk of collision region;
   obtain a time to collision (TTC) with the obstacle based on the first position;
   predict a second position of the obstacle after the TTC;
   generate a second risk of collision region based on the second position;
   determine whether the obstacle exists in the second risk of collision region based on the processed image information;
   adjust the risk level based on the presence of the obstacle in the second risk of collision region; and
   perform a collision avoidance control corresponding to the adjusted risk level.

2. The advanced driver assistance system according to claim 1, wherein, in response to determining that the obstacle exists in the first risk of collision region, the controller is configured to increase a preset risk level by a first size.

3. The advanced driver assistance system according to claim 1, further comprising:
   an obstacle detector,
   wherein the controller is configured to:
   obtain position information of the obstacle based on obstacle information detected by the obstacle detector; and
   determine whether the obstacle exists in the first risk of collision region based on the obtained position information of the obstacle.

4. The advanced driver assistance system according to claim 3, further comprising:
   a communication network configured to communicate with a driving information detector configured to detect driving information of a vehicle,
   wherein the controller is configured to:
   obtain position information and speed information of the obstacle based on a driving speed and the obstacle information among driving information of the vehicle;
   obtain a time until collision with the obstacle based on the obtained position information and speed information of the obstacle; and
   predict the second position of the obstacle after the time until the collision with the obstacle.

5. The advanced driver assistance system according to claim 1, further comprising:
   a communication network configured to communicate with a driving information detector configured to detect driving information of a vehicle,
   wherein the controller is configured to predict the second position of the obstacle based on the driving speed and a yaw rate among the driving information of the vehicle.

6. The advanced driver assistance system according to claim 1, wherein, in response to determining that the obstacle exists in the second risk of collision region, the controller is configured to increase a preset risk level by a second size.

7. The advanced driver assistance system according to claim 1, wherein the controller is configured to generate the first and second risk of collision regions in a funnel shape, a triangular shape, or a trumpet shape.

8. A vehicle comprising:
a camera configured to obtain an image of a road and output image information;
an obstacle detector configured to detect an obstacle and output obstacle information;
a driving information detector configured to detect driving information of the vehicle; and
a controller configured to:
generate a first risk of collision region based on a turn path,
predict a first position of the obstacle based on the obstacle information,
determine whether the obstacle exists in the first risk of collision region based on the processed image information,
adjust a risk level based on the presence of the obstacle in the first risk of collision region,
obtain a time to collision (TTC) with the obstacle based on the first position,
predict a second position of the obstacle after the TTC,
generate a second risk of collision region based on the second position of the obstacle,
determine whether the obstacle exists in the second risk of collision region based on the image information,
adjust the risk level based on the presence of the obstacle in the second risk of collision region, and
perform a collision avoidance control corresponding to the adjusted risk level.

9. The vehicle according to claim 8, wherein the controller is configured to:
determine whether a section to be driven is a turn section based on navigation information; and
in response to determining that the section to be driven is the turn section, generate the turn path based on the image information or map information.

10. The vehicle according to claim 8, further comprising:
an operation lever configured to receive a command to turn on a turn indication lamp,
wherein the controller is configured to:
in response to receiving an operation signal from the operation lever, determine whether a section to be driven is a turn section based on navigation information; and
in response to determining that the section to be driven is the turn section, generate the turn path based on the image information or map information.

11. The vehicle according to claim 8, wherein the controller is configured to:
in response to determining that the obstacle exists in the first risk of collision region, increase a preset risk level by a first size; and
in response to determining that the obstacle exists in the second risk of collision region, increase the preset risk level by a second size.

12. The vehicle according to claim 8, wherein the controller is configured to:
obtain position information and speed information of the obstacle based on a driving speed and the obstacle information among driving information of the vehicle;
obtain a time until collision with the obstacle based on the obtained position information and speed information of the obstacle; and
predict the second position of the obstacle after the time until the collision with the obstacle based on the driving speed and a yaw rate among the driving information of the vehicle.

13. A method of controlling a vehicle comprising:
determining, by a controller, whether a section to be driven is a turn section;
in response to determining that the section to be driven is the turn section, generating, by the controller, a turn path;
generating, by the controller, a first risk of collision region based on the generated turn path;
predicting, by the controller, a first position of an obstacle based on obstacle information detected by an obstacle detector and driving information detected by a driving information detector;
determining whether the obstacle exists in the first risk of collision region based on image information obtained from an imager;
adjusting a risk level based on the presence of the obstacle in the first risk of collision region;
obtaining a time to collision (TTC) with the obstacle based on the first position;
predicting a second position of the obstacle after the TTC;
generating, by the controller, a second risk of collision region based on the second position of the obstacle;
determining, by the controller, whether the obstacle exists in the second risk of collision regions based on the image information;
adjusting, by the controller, the risk level based on the presence of the obstacle in the second risk of collision regions; and
performing, by the controller, a collision avoidance control corresponding to the adjusted risk level.

14. The method according to claim 13, wherein the determining of whether the section to be driven is the turn section includes:
determining whether the section to be driven is the turn section based on at least one of an operation signal of an operation lever for lighting a turn indication lamp and navigation information.

15. The method according to claim 13, wherein the generating of the turn path includes:
generating the turn path based on the image information or map information.

16. The method according to claim 13, wherein the generating of the turn path includes:
generating the turn path based on at least one of a driving speed, a yaw rate, and a steering angle among the driving information of the vehicle.

17. The method according to claim 13, wherein the adjusting of the risk level includes:
in response to determining that the obstacle exists in the first risk of collision region, increasing a preset risk level by a first size; and
in response to determining that the obstacle exists in the second risk of collision region, increasing the preset risk level by a second size.

18. The method according to claim 13, wherein the predicting of the second position of the obstacle includes:
obtaining position information and speed information of the obstacle based on a driving speed and the obstacle information among the driving information;

obtaining a time until collision with the obstacle based on the obtained position information and speed information of the obstacle; and predicting the position of the obstacle after the time until the collision with the obstacle based on the driving speed and a yaw rate among the driving information of the vehicle.

\* \* \* \* \*